(12) United States Patent
Bergqvist et al.

(10) Patent No.: US 8,811,166 B2
(45) Date of Patent: Aug. 19, 2014

(54) RECEIVING RADIO ACCESS TECHNOLOGY PRIORITY SETTINGS DEPENDING ON THE OPERATION MODE OF A TERMINAL

(75) Inventors: Jens Bergqvist, Linkoping (SE); Thomas Johansson, Aby (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 267 days.

(21) Appl. No.: 12/999,360

(22) PCT Filed: Jun. 12, 2009

(86) PCT No.: PCT/SE2009/050728
§ 371 (c)(1),
(2), (4) Date: Dec. 16, 2010

(87) PCT Pub. No.: WO2009/154550
PCT Pub. Date: Dec. 23, 2009

(65) Prior Publication Data
US 2011/0090790 A1 Apr. 21, 2011

Related U.S. Application Data

(60) Provisional application No. 61/073,488, filed on Jun. 18, 2008.

(51) Int. Cl.
| | | |
|---|---|---|
| H04L 1/00 | (2006.01) |
| H04L 12/26 | (2006.01) |
| H04W 36/00 | (2009.01) |
| H04W 36/30 | (2009.01) |
| H04W 36/16 | (2009.01) |
| H04W 36/24 | (2009.01) |
| H04W 48/16 | (2009.01) |
| H04L 12/56 | (2006.01) |
| H04W 8/18 | (2009.01) |
| H04W 36/14 | (2009.01) |
| H04W 48/18 | (2009.01) |
| H04W 40/24 | (2009.01) |
| H04W 88/06 | (2009.01) |
| H04W 36/08 | (2009.01) |

(52) U.S. Cl.
CPC .......... *H04W 36/0061* (2013.01); *H04W 48/16* (2013.01); *H04L 47/2441* (2013.01); *H04W 8/18* (2013.01); *H04W 36/30* (2013.01); *H04W 36/16* (2013.01); *H04W 36/14* (2013.01); *H04W 48/18* (2013.01); *H04W 40/24* (2013.01); *H04L 47/10* (2013.01); *H04W 88/06* (2013.01); *H04W 36/24* (2013.01); *H04W 36/08* (2013.01); *H04L 47/15* (2013.01)
USPC ........................................................ 370/230

(58) Field of Classification Search
None
See application file for complete search history.

(56) References Cited

U.S. PATENT DOCUMENTS 6,014,565 A * 1/2000 Bonta ............................ 455/437
6,119,003 A * 9/2000 Kukkohovi ................. 455/435.2

(Continued)

FOREIGN PATENT DOCUMENTS

| EP | 1860903 A1 | 11/2007 |
| JP | 2001352576 A | 12/2001 |

(Continued)

OTHER PUBLICATIONS

3rd Generation Partnership Project. "Correction on the Applicability of the Individually Given Rep-Priority List." 3GPP TSG-GERAN Meeting #19, Tdoc GP-040700, Cancun, Mexico, Apr. 19-23, 2004.

(Continued)

*Primary Examiner* — Ayaz Sheikh
*Assistant Examiner* — Blanche Wong
(74) *Attorney, Agent, or Firm* — Coats & Bennett, PLLC

(57) ABSTRACT

The present invention relates to methods and arrangements of handling inter-working between different radio access technologies in a telecommunication system comprising communication network nodes (10; 15) communicating with a plurality of user equipments (18) on uplink (17) and downlink (16) channels. Radio access technology priority settings depending on in which operation mode said user equipment (18) is in, sent by the communication network node (10; 15), are received in the user equipment (18).

25 Claims, 4 Drawing Sheets

(56) References Cited

U.S. PATENT DOCUMENTS

| | | | |
|---|---|---|---|
| 6,400,962 B1* | 6/2002 | Yamada | 455/552.1 |
| 7,072,663 B2* | 7/2006 | Ramos et al. | 455/453 |
| 8,090,376 B2* | 1/2012 | Tolli et al. | 455/439 |
| 8,219,093 B2* | 7/2012 | Lee et al. | 455/436 |
| 8,280,377 B2* | 10/2012 | Lee et al. | 455/436 |
| 2001/0029191 A1 | 10/2001 | Wilhelm | |
| 2007/0191020 A1 | 8/2007 | Fischer et al. | |
| 2007/0287468 A1 | 12/2007 | Jeong et al. | |
| 2008/0176565 A1* | 7/2008 | Eerolainen et al. | 455/436 |
| 2008/0182615 A1* | 7/2008 | Xue et al. | 455/552.1 |
| 2008/0200197 A1 | 8/2008 | Gessner et al. | |
| 2009/0088159 A1* | 4/2009 | Wu et al. | 455/436 |
| 2009/0111510 A1 | 4/2009 | Ono | |
| 2009/0209263 A1 | 8/2009 | Breuer et al. | |
| 2012/0058793 A1 | 3/2012 | Voyer et al. | |

FOREIGN PATENT DOCUMENTS

| | | |
|---|---|---|
| JP | 2002517963 A | 6/2002 |
| JP | 2007124642 A | 5/2007 |
| JP | 2009525674 A | 7/2009 |
| WO | 2004100460 A2 | 11/2004 |
| WO | 2007123170 A1 | 11/2007 |
| WO | 2008011420 A1 | 1/2008 |

OTHER PUBLICATIONS

3rd Generation Partnership Project. "Drivers for Inter-RAT Radio Resource Management." 3GPP TSG-RAN WG2 Meeting #57-bis, R2-071351, Malta, Mar. 26-30, 2007.

3rd Generation Partnership Project. "Generic 'Subcriber Type'." 3GPP TSG-RAN WG2 Meeting #61, R2-080972, Sorrento, Italy, Feb. 11-15, 2008.

* cited by examiner

RECEIVING RADIO ACCESS TECHNOLOGY PRIORITY SETTINGS DEPENDING ON THE OPERATION MODE OF A TERMINAL

TECHNICAL FIELD

The present invention relates to methods and arrangements in a telecommunication system, in particular to arrangements allowing for handling interworking between different radio access technologies as well as methods for such handling.

BACKGROUND

There is currently ongoing work within $3^{rd}$ Generation Partnership Project (3GPP) to introduce a new Radio Access Technology (RAT) called E-UTRAN, also known as Long Term Evolution (LTE). How to handle interworking between E-UTRAN and the other existing RATs, mainly GSM/EDGE Radio Access Network (GERAN) and UMTS Terrestrial Radio Access Network (UTRAN), is being specified. As part of that, so called "RAT priorities" are being defined.

The RAT priorities are settings that are to be broadcasted from the network to the user equipments in order to inform about what RAT the user equipments shall prioritize for camping selection in idle mode. An operator may thus define the general camping priorities for the user equipments. Typically, an operator would prioritize that the user equipments camp in E-UTRAN when it has such capability and coverage. It may be noted that these priorities also may be defined on frequency level or frequency group level per RAT.

When the user equipment is operating in GERAN and has an ongoing Circuit Switched (CS) call and/or packet session, i.e. when it is in dedicated mode, dual transfer mode or packet transfer mode, there will be problems to perform measurements for all the different RATs since there are only limited measurement gaps for the user equipment. There are also limitations regarding the number of neighbouring cells that the user equipment may include in the measurements reports to the network. Therefore, even if there are neighbouring cells from several different RATs with good radio quality for the user equipment, it will not be able to measure all those cells and/or send reports for all of them to the network.

Depending on the type of service that a certain user equipment is running, it will in many cases not be preferred that the user equipment performs cell reselection to E-UTRAN or even another RAT. For example, in case the user equipment is in dedicated mode with a CS speech call ongoing, it would typically be preferable to keep the user equipment within GERAN for the duration of the call.

There has been a proposal within 3GPP TS GERAN to introduce a process to activate/deactivate measurement reporting, and possibly even the actual measurements, for E-UTRAN neighbour cells while in GERAN dedicated or dual transfer mode (DTM). The activate/deactivate command was proposed to be sent from the network to the user equipment in the ASSIGNMENT COMMAND, FREQUENCY REDEFINITION, MEASUREMENT INFORMATION, EXTENDED MEASUREMENT ORDER or HANDOVER COMMAND messages, and the corresponding DTM messages. However, even though a CS handover from GERAN to E-UTRAN would typically not be desirable, in cases where the user equipment enters areas with only E-UTRAN coverage, such a handover would still be needed. In addition, typically UTRAN would also have higher priority than GERAN for idle mode camping priority but still CS handover to UTRAN would preferably not be performed during the speech call unless needed for coverage reasons.

Also the European patent application EP 1860903 describes a method for controlling a radio cell monitoring system and the document "Drivers for inter-RAT Radio Resource Management" 3GPP DRAFT; R2-071351 provides further background.

Also, when operating in packet transfer mode, for certain types of services it will be preferred to keep the user equipment in GERAN in order to avoid an inter-RAT cell reselection during the transfer. Thus in many cases, there are differences between the priorities wanted for camping purposes when in idle mode and what is wanted for operation in dedicated, dual transfer or packet transfer mode.

SUMMARY

Accordingly, one object of embodiments of the present invention is to provide improved methods and arrangements of handling interworking between different radio access technologies in a telecommunication system comprising communication network nodes communicating with a plurality of user equipments on uplink and downlink channels.

According to a first aspect of embodiments of the present invention this objective is achieved through a method in a user equipment as defined in the characterizing portion of claim 1, which specifies that interworking between different radio access technologies is handled by a method which performs the step of receiving radio access technology priority settings depending on in which operation mode said user equipment is in.

According to a second aspect of embodiments of the present invention this objective is achieved through a method in a communication network node as defined in the characterizing portion of claim 11, which specifies that interworking between different radio access technologies is handled by a method which performs the step of sending radio access technology priority settings to a user equipment depending on in which operation mode said user equipment is in.

According to a third aspect of embodiments of the present invention this objective is achieved through an arrangement in a user equipment as defined in the characterizing portion of claim 17, which specifies that interworking between different radio access technologies is handled by an arrangement comprising a receiving unit arranged to receive radio access technology priority settings depending on in which operation mode said user equipment is in.

According to a fourth aspect of embodiments of the present invention this objective is achieved through an arrangement in a communication network node as defined in the characterizing portion of claim 18, which specifies that interworking between different radio access technologies is handled by an arrangement comprising a transmitting unit arranged to send radio access technology priority settings depending on in which operation mode said user equipment is in.

Further embodiments are listed in the dependent claims.

Thanks to the provision of methods and arrangements, which enable the possibility to provide different RAT priority settings for different modes of operation, a mobility behaviour for each mode of operation is achieved. Handover from one RAT, e.g. GERAN, to another, e.g. E-UTRAN, during an ongoing packet transfer is avoided leading to less unnecessary interruptions. Further, related signalling for inter-RAT handover/re-selection is avoided for cases where the handover/re-selection is not necessary or preferred.

Still other objects and features of embodiments of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
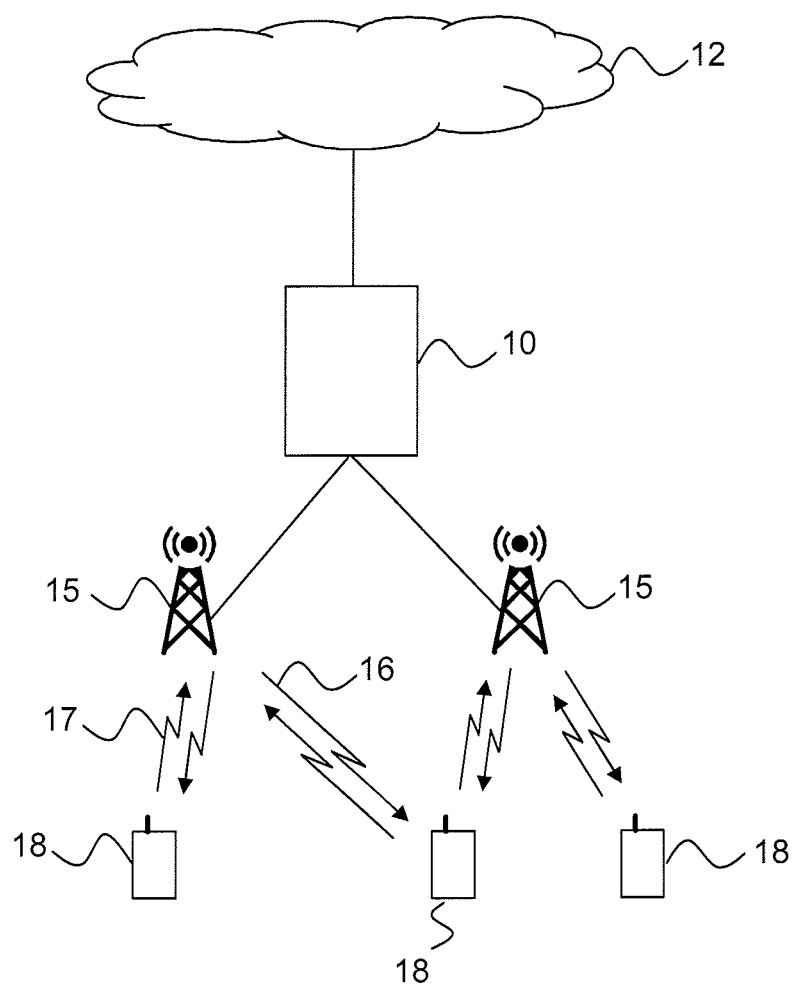
FIG. 1 shows a communication network architecture according to embodiments of the present invention.

FIG. 1 depicts a communication system including a Radio Access Network (RAN), such as the GSM/EDGE Radio Access Network (GERAN) architecture, comprising at least one Base Transciever Station (BTS) 15 (two are shown in FIG. 1) connected to one or more Base Station Controllers (BSCs) 10. The RAN is connected to a Core network (CN) 12. The RAN and the CN 12 provide communication and control for a plurality of user equipments (UE) 18 that each uses downlink (DL) channels 16 and uplink (UL) channels 17. For the reason of clarity, only one uplink channel is denoted 17 and one downlink channel denoted 16. On the downlink channel 16, the BTS 15 transmits data to each user equipment 18. On the uplink channel 17, the user equipments 18 transmit data to the BTS 15.

The user equipments 18 may be mobile stations such as mobile telephones ("cellular" telephones) and laptops with mobile termination and thus may be, for example, portable, pocket, hand-held, computer-included or car-mounted mobile devices which communicate voice and/or data with the RAN.

An exemplary embodiment of the present invention introduces specific RAT priority settings for the different modes of operation within a RAT, e.g. GERAN. Examples of different modes of operation in GERAN are idle mode, dedicated mode, dual transfer mode and packet transfer mode. Different RAT priority settings may then apply for the different modes, depending on the wanted behaviour in that mode.

The RAT priority settings to be used when in dedicated mode and dual transfer mode may either be broadcasted from the network in the system information sent on the Broadcast Control Channel (BCCH) or on the Packet Broadcast Control Channel (PBCCH) or, sent from the network to the user equipment when it enters dedicated mode/dual transfer mode, or during mobility procedures, e.g. in ASSIGNMENT COMMAND, FREQUENCY REDEFINITION, MEASUREMENT INFORMATION, EXTENDED MEASUREMENT ORDER, HANDOVER COMMAND messages and corresponding dual transfer mode messages.

When the user equipment is in dedicated mode or dual transfer mode and has received RAT priority settings that are specific for that mode, the user equipment shall use those settings to:

determine what RATs and/or frequencies or groups of frequencies within those RATs, that the user equipment shall perform measurements on, and determine what RATs and/or frequencies or groups of frequencies within those RATs, that the user equipment shall include in the measurement reports sent to the network.

The RAT priority settings to be used when in packet transfer mode may be sent from the network to the user equipment in several different ways. As a first alternative, the priority settings are sent in the PACKET CELL CHANGE ORDER and/or PACKET MEASUREMENT ORDER messages.

As a second alternative, The RAT priority settings specific for packet transfer mode are broadcasted in the system information sent on the BCCH or on the PBCCH. The broadcast settings shall then be used initially by the user equipment when in packet transfer mode until it received new settings.

As a third alternative, a new message from the network to the user equipment is introduced for this signalling.

When the user equipment is in packet transfer mode and has received RAT priority settings that are specific for packet transfer mode, the use of those settings depends on the network control mode the user equipment is in.

In NC2 or network controlled cell re-selection mode, the RAT priority settings should be used to:

determine what RATs and/or frequencies or groups of frequencies within those RATs, the user equipment shall perform measurements on; and determine what RATs and/or frequencies or groups of frequencies within those RATs, the user equipment shall include in the measurement reports sent to the network.

In other network control modes, e.g. user equipment controlled cell re-selection mode, the RAT priority settings may be used to determine towards what RAT and/or frequency or group of frequencies within those RATs, the user equipment shall trigger cell reselection to. In other words, the RAT priority settings may be used by the user equipment in its cell reselection decisions.

The RAT priority settings used when in packet transfer mode may also be dependent on the type of service that is running. In case a packet flow is added or removed, e.g. a new type of service is added or an existing is removed for the packet transfer, the network may update the RAT priority settings.

Figure 2:
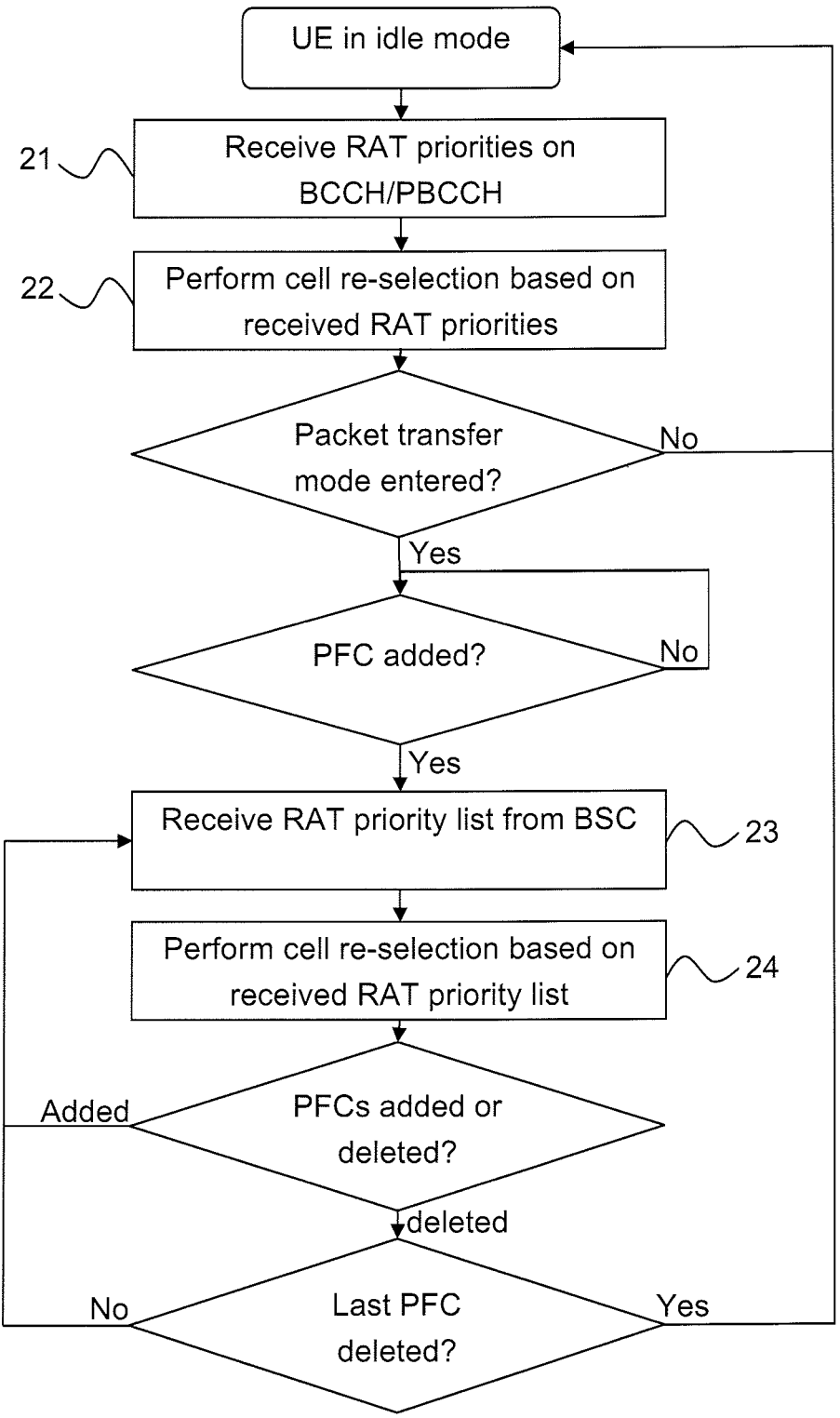
FIG. 2 is a flowchart illustrating the inventive method in a user equipment.

According to embodiments of the present invention, the procedure in a user equipment of handling interworking between different radio access technologies in a telecommunication system comprising communication network nodes communicating with a plurality of user equipments on uplink and downlink channels, as shown in FIG. 2, is as follows:

receiving radio access technology priority settings depending on in which operation mode said user equipment is in (step 21);

according to some embodiments, performing cell re-selection based on said received radio access technology priority settings (step 22);

when said user equipment enters packet transfer mode and if a PFC has been added, receiving said radio access technology priority settings as a priority list created by a communication network controlling node (step 23);

performing cell re-selection based on said received priority list (step 24);

when a packet flow context (PFC) is added or removed, receiving an updated priority list (step 23);

when a last packet flow context has been removed, the user equipment enters idle mode.

According to some embodiments, said received radio access technology priority settings are used to determine what radio access technologies and/or frequencies or groups of frequencies within those radio access technologies to perform measurements on.

According to some embodiments, said received radio access technology priority settings are used to determine what radio access technologies and/or frequencies or groups of frequencies within those radio access technologies to include in measurement reports sent to said communication network nodes.

According to some embodiments, when said user equipment is in a network controlled cell re-selection mode, said received radio access technology priority settings are used to determine what radio access technologies and/or frequencies or groups of frequencies within those radio access technologies to perform measurements on.

According to some embodiments, when said user equipment is in a network controlled cell re-selection mode, said received radio access technology priority settings are used to determine what radio access technologies and/or frequencies or groups of frequencies within those radio access technologies to include in measurement reports sent to said communication network nodes.

According to some embodiments, when said user equipment is in a user equipment controlled cell re-selection mode, said received radio access technology priority settings are used to determine towards what radio access technologies and/or frequencies or groups of frequencies within those radio access technologies to trigger cell re-selection.

According to some embodiments, said radio access technology priority settings are received on a broadcast channel.

According to some embodiments, said radio access technology priority settings are received in a signalling message.

Figure 3:
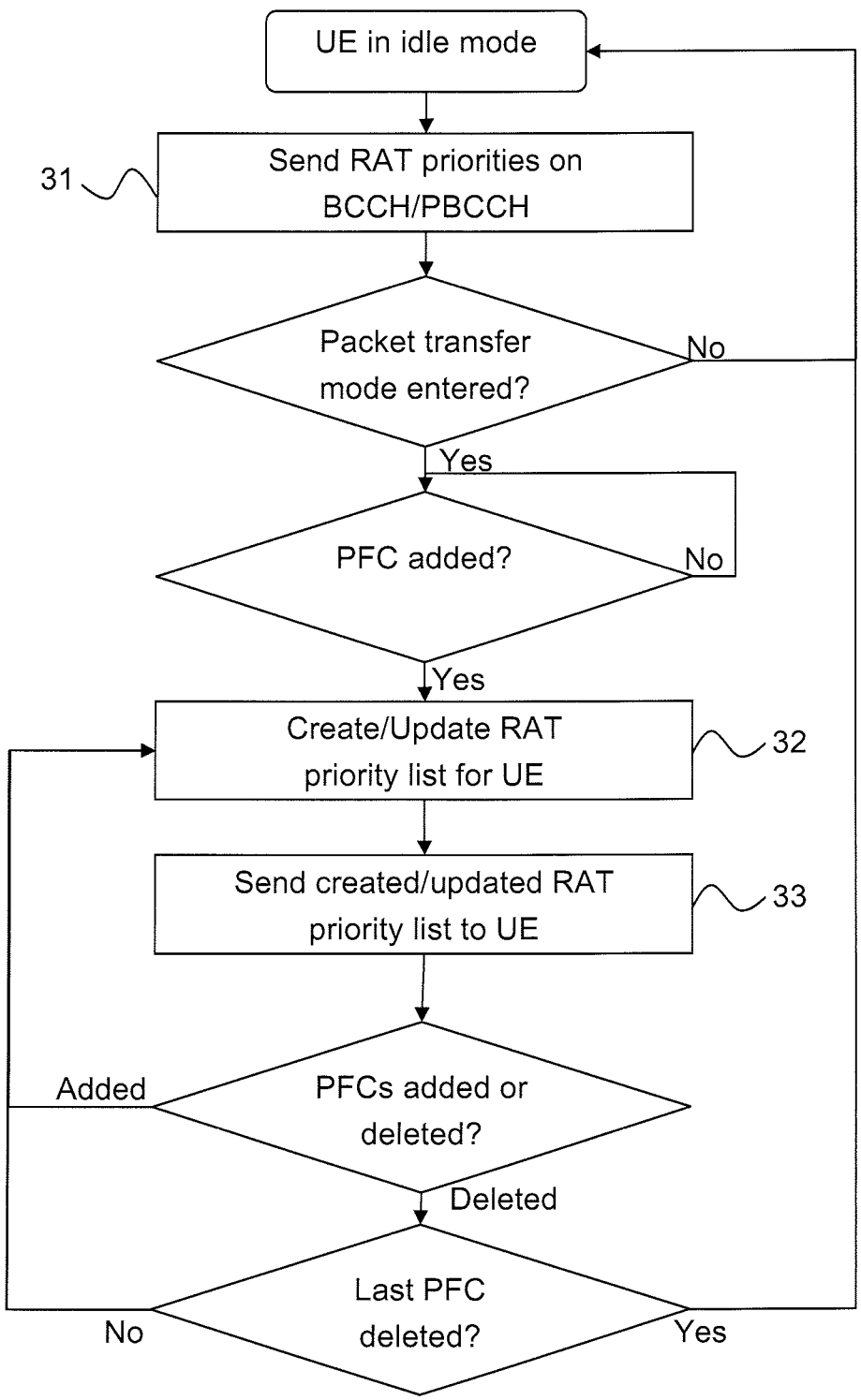
FIG. 3 is a flowchart illustrating the inventive method in a communication network node.

According to embodiments of the present invention, the procedure in a communication network node of handling interworking between different radio access technologies in a telecommunication system comprising communication network nodes communicating with a plurality of user equipments on uplink and downlink channels, as shown in FIG. 3, is as follows:
- sending radio access technology priority settings to a user equipment depending on in which operation mode said user equipment is in (step 31);
- when said user equipment enters a packet transfer mode and if a PFC is added, creating a priority list (step 32) comprising said radio access technology priority settings based on at least one of the following: quality of service for packet flow contexts; service UTRAN cell change order (COO); or configuration data; and,
- sending said radio access technology priority settings to said user equipment (step 33);
- when a packet flow context (PFC) is added or removed, updating said priority list (step 32);
- sending said updated said priority list comprising updated radio access technology priority settings to said user equipment (step 33);
- when a last packet flow context has been removed, the user equipment enters idle mode.

According to some embodiments, measurement reports are received from said user equipments of radio access technologies and/or frequencies or groups of frequencies within those radio access technologies based on said sent radio access technology priority settings.

According to some embodiments, said radio access technology priority settings are sent on a broadcast channel.

According to some embodiments, said radio access technology priority settings are sent in a signalling message.

Figure 4:
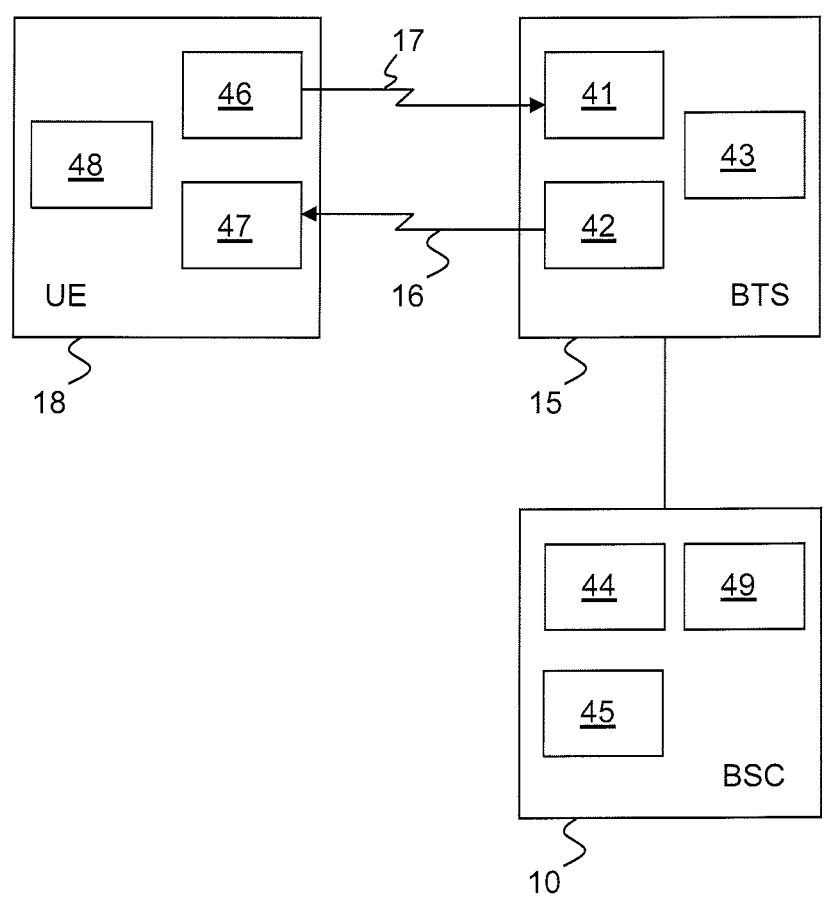
FIG. 4 is a simplified block diagram of an inventive user equipment and communication network nodes.

FIG. 4 is a block diagram showing a user equipment 18 and a communication network node 15, such as a Base Transceiver Station (BTS) and another communication network node 10, such as a Base Station Controller (BSC) for handling interworking between different radio access technologies in a telecommunication system comprising communication network nodes communicating with a plurality of user equipments on uplink and downlink channels The BTS 15 (which is a communication network node) comprises a transmitting unit 42 including a radio transmitter and a receiving unit 41 including a receiver. The transmitter 42 is transmitting data to a receiver 47 of the user equipment 18 over a radio interface on the downlink channel 16. The receiver 41 is receiving data from the user equipment 18 on the uplink channel 17. the transmitting unit 42 is further arranged to send radio access technology priority settings to a user equipment depending on in which operation mode said user equipment is in.

According to some embodiments, the receiving unit 41 is arranged to receive measurement reports from said user equipments 18 of radio access technologies and/or frequencies or groups of frequencies within those radio access technologies based on said sent radio access technology priority settings.

According to some embodiments, when said user equipment 18 is in a packet transfer mode, the BTS 15 further comprises a processing unit 43 arranged to create a priority list comprising said radio access technology priority settings based on at least one of the following: quality of service for packet flow contexts; service UTRAN cell change order; or configuration data, whereby said transmitting unit further is arranged to send said created priority list comprising said radio access technology priority settings to said user equipment 18.

According to some embodiments, said processing unit 43 is further arranged to update said priority list when a packet flow context is added or removed.

According to some embodiments, said receiving unit 47 is further arranged to receive said radio access technology priority settings on a broadcast channel.

According to some embodiments, said receiving unit 47 is further arranged to receive said radio access technology priority settings in a signalling message.

The BSC 10 (which is a communication network node) comprises a transmitting unit 44 including a transmitter. The BSC 10 further comprises a receiving unit 45 including a receiver. The transmitter 44 is transmitting data to a receiver 48 of the user equipment 18 via the BTS 15. The receiver 45 is receiving data from the user equipment 18 via the BTS 15. The transmitting unit 44 is further arranged to send radio access technology priority settings to a user equipment depending on in which operation mode said user equipment is in.

According to some embodiments, the receiving unit 45 is arranged to receive measurement reports from said user equipments of radio access technologies and/or frequencies or groups of frequencies within those radio access technologies based on said sent radio access technology priority settings.

According to some embodiments, when said user equipment is in a packet transfer mode, the BSC 10 further comprises a processing unit 49 arranged to create a priority list comprising said radio access technology priority settings based on at least one of the following: quality of service for packet flow contexts; service UTRAN cell change order; or configuration data, whereby said transmitting unit further is arranged to send said created priority list comprising said radio access technology priority settings to said user equipment 18.

According to some embodiments, said processing unit 49 is further arranged to update said priority list when a packet flow context is added or removed.

According to some embodiments, said receiving unit 47 is further arranged to receive said radio access technology priority settings on a broadcast channel.

According to some embodiments, said receiving unit 47 is further arranged to receive said radio access technology priority settings in a signalling message.

The user equipment 18 comprises a transmitting unit 46 including a radio transmitter. The radio transmitter is arranged to transmit data packets to the receiver 41 of the BTS 15 over the radio interface on the uplink channel 17 or, to the receiver 45 of the BSC10 via the BTS 15. The UE 18 further comprises a receiving unit 47 including a receiver. The receiver is arranged to receive data packets transmitted from the transmitter 42 of the BTS 15 on the downlink channel 16 or, from the transmitter 44 of the BTS10 via the BTS 15. The receiving unit 47 is further arranged to receive radio access technology priority settings depending on in which operation mode said user equipment is in.

According to some embodiments, the user equipment further comprises a processing unit 48 arranged to use said received radio access technology priority settings to determine what radio access technologies and/or frequencies or groups of frequencies within those radio access technologies to perform measurements on.

According to some embodiments, the processing unit 48 is arranged to use said received radio access technology priority settings to determine what radio access technologies and/or frequencies or groups of frequencies within those radio access technologies to include in measurement reports sent to said communication network nodes.

According to some embodiments, the processing unit 48 is arranged to perform cell re-selection based on said received radio access technology priority settings.

According to some embodiments, when said user equipment is in a packet transfer mode, said receiving unit 47 further is arranged to receive said radio access technology priority settings as a priority list created by a communication network controlling node.

According to some embodiments, when said user equipment is in a network controlled cell re-selection mode, the processing unit 48 is arranged to use said received radio access technology priority settings to determine what radio access technologies and/or frequencies or groups of frequencies within those radio access technologies to perform measurements on.

According to some embodiments, when said user equipment is in a network controlled cell re-selection mode, the processing unit 48 is arranged to use said received radio access technology priority settings to determine what radio access technologies and/or frequencies or groups of frequencies within those radio access technologies to include in measurement reports sent to said communication network nodes.

According to some embodiments, when said user equipment is in a user equipment controlled cell re-selection mode, the processing unit 48 is arranged to use said received radio access technology priority settings to determine towards what radio access technologies and/or frequencies or groups of frequencies within those radio access technologies to trigger cell re-selection.

According to some embodiments, said receiving unit 47 is further arranged to receive said radio access technology priority settings on a broadcast channel.

According to some embodiments, said receiving unit 47 is further arranged to receive said radio access technology priority settings in a signalling message.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim embodiments of the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method in a user equipment of handling interworking between different radio access technologies in a telecommunication system, wherein the telecommunication system comprises communication network nodes communicating with a plurality of user equipments on uplink and downlink channels, the method comprising:
   operating the user equipment in a first operation mode among multiple operation modes defined within a particular one of said radio access technologies;
   receiving first radio access technology priority settings specific for the first operation mode;
   switching to operating the user equipment in a second operation mode among said multiple operation modes, the second operation mode differing from the first operation mode; and
   receiving second radio access technology priority settings specific for the second operation mode, the second radio access technology priority settings configuring the user equipment to prioritize said radio access technologies differently than the first radio access technology priority settings.

2. A method according to claim 1, further comprising, when operating the user equipment in the first and second operation modes, respectively using said first and second radio access technology priority settings to determine at least one of:
   which ones of said radio access technologies to perform measurements on, and
   what frequencies or groups of frequencies to perform measurements on.

3. A method according to claim 1, further comprising, when operating the user equipment in the first and second operation modes, respectively using said first and second radio access technology priority settings to determine at least one of:
   which ones of said radio access technologies to include in measurement reports sent to said communication network nodes, and
   what frequencies or groups of frequencies to include in measurement reports sent to said communication network nodes.

4. A method according to claim 1, further comprising, when operating the user equipment in the first and second operation modes, respectively performing cell re-selection based on said first and second radio access technology priority settings.

5. A method according to claim 1, wherein the second operation mode is a packet transfer mode and wherein the second radio access technology priority settings comprises a priority list created by one of said communication network nodes that controls other ones of said communication network nodes.

6. A method according to claim 5, further comprising, when said user equipment is in a network controlled cell re-selection mode while operating in the packet transfer mode, using said second radio access technology priority settings to determine at least one of:
   which ones of said radio access technologies to perform measurements on, and
   what frequencies or groups of frequencies to perform measurements on.

7. A method according to claim 5, further comprising, when said user equipment is in a network controlled cell re-selection mode while operating in the packet transfer mode, using said second radio access technology priority settings to determine at least one of:
   which ones of said radio access technologies to include in measurement reports sent to said communication network nodes, and
   what frequencies or groups of frequencies to include in measurement reports sent to said communication network nodes.

8. A method according to claim 5, further comprising, when said user equipment is in a user equipment controlled cell re-selection mode while operating in the packet transfer mode, using said second radio access technology priority settings to determine at least one of:
   towards which ones of said radio access technologies to trigger cell re-selection, and
   towards what frequencies or groups of frequencies to trigger cell re-selection.

9. A method according to claim 1, comprising receiving at least one of said first and second radio access technology priority settings on a broadcast channel.

10. A method according to claim 1, comprising receiving at least one of said first and second radio access technology priority settings in a signalling message.

11. A method according to claim 1, wherein said radio access technologies include GERAN (GSM/EDGE Radio Access Network) and E-UTRAN (Evolved UMTS Terrestrial Radio Access Network), wherein the particular one of said radio access technologies is GERAN, wherein the first operation mode is idle mode, and wherein the second operation mode is either dedicated mode, dual transfer mode, or packet transfer mode.

12. The method according to claim 1, wherein the second operation mode comprises a packet transfer mode, and wherein said second radio access technology priority settings are also specific for a type of service that the user equipment is being provided while operating in the packet transfer mode.

13. A method in a communication network node of handling interworking between different radio access technologies in a telecommunication system, wherein the telecommunication system comprises communication network nodes communicating with a plurality of user equipments on uplink and downlink channels, wherein the method comprises:
   determining whether the user equipment is operating in a first operation mode or a second operation mode among multiple operation modes defined within a particular one of said radio access technologies, the first and second operation modes being different;
   when the user equipment is operating in the first operation mode according to said determination, sending the user equipment first radio access technology settings specific for the first operation mode; and
   when the user equipment is operating in the second operation mode according to said determination, sending the user equipment second radio access technology settings specific for the second operation mode, the second radio access technology priority settings configuring the user equipment to prioritize said radio access technologies differently than the first radio access technology priority settings.

14. A method according to claim 13, further comprising receiving at least one of:
   measurement reports from said user equipment of radio access technologies based on said sent radio access technology priority settings, and
   measurement reports from said user equipment of frequencies or groups of frequencies based on said sent radio access technology priority settings.

15. A method according to claim 13, wherein the second operation mode is a packet transfer mode, and wherein the method further comprises, when said user equipment is in a the packet transfer mode:
   creating a priority list comprising said second radio access technology priority settings based on at least one of:
      quality of service for packet flow contexts;
      service UTRAN cell change order;
      configuration data; and
   sending said priority list to said user equipment.

16. A method according to claim 15, further comprising updating said priority list when a packet flow context is added or removed.

17. A method according to claim 13, comprising sending at least one of said first and second radio access technology priority settings on a broadcast channel.

18. A method according to claim 13, comprising sending at least one of said first and second radio access technology priority settings in a signalling message.

19. A method according to claim 13, wherein said radio access technologies include GERAN (GSM/EDGE Radio Access Network) and E-UTRAN (Evolved UMTS Terrestrial Radio Access Network), wherein the particular one of said radio access technologies is GERAN, wherein the first operation mode is idle mode, and wherein the second operation mode is either dedicated mode, dual transfer mode, or packet transfer mode.

20. The method according to claim 13, wherein the second operation mode comprises a packet transfer mode, and wherein said second radio access technology priority settings are also specific for a type of service that the user equipment is being provided while operating in the packet transfer mode.

21. A user equipment configured for handling interworking between different radio access technologies in a telecommunication system, wherein the telecommunication system comprises communication network nodes communicating with a plurality of user equipments on uplink and downlink channels, the user equipment comprising:
    a processing circuit configured to:
        operate the user equipment in a first operation mode among multiple operation modes defined within a particular one of said radio access technologies;
        receive first radio access technology priority settings specific for the first operation mode;
        switch to operating the user equipment in a second operation mode among said multiple operation modes, the second operation mode differing from the first operation mode; and
        receive second radio access technology priority settings specific for the second operation mode, the second radio access technology priority settings configuring the user equipment to prioritize said radio access technologies differently than the first radio access technology priority settings.

22. The user equipment according to claim 21, wherein the second operation mode comprises a packet transfer mode, and wherein said second radio access technology priority settings are also specific for a type of service that the user equipment is being provided while operating in the packet transfer mode.

23. The user equipment according to claim 21, wherein the processing circuit is further configured to use the first and second radio access technology priority settings when respectively operating in the first and second operation modes, to control at least one of performing measurements, sending measurement reports, and performing cell reselection.

24. A communication network node configured for handling interworking between different radio access technologies in a telecommunication system, wherein the telecommunication system comprises communication network nodes communicating with a plurality of user equipments on uplink and downlink channels, the communication network node comprising:
    a processing circuit configured to:
        determine whether the user equipment is operating in a first operation mode or a second operation mode among multiple operation modes defined within a particular one of said radio access technologies, the first and second operation modes being different;
        when the user equipment is operating in the first operation mode according to said determination, create first radio access technology settings specific for the first operation mode; and
        when the user equipment is operating in the second operation mode according to said determination, create second radio access technology settings specific for the second operation mode, the second radio access technology priority settings configuring the user equipment to prioritize said radio access technologies differently than the first radio access technology priority settings; and
    a transmitter configured to send the created radio access technology priority settings to that user equipment.

25. The communication network node according to claim 24, wherein the second operation mode comprises a packet transfer mode, and wherein said second radio access technology priority settings are also specific for a type of service that the user equipment is being provided while operating in the packet transfer mode.

* * * * *

UNITED STATES PATENT AND TRADEMARK OFFICE
CERTIFICATE OF CORRECTION

PATENT NO. : 8,811,166 B2
APPLICATION NO. : 12/999360
DATED : August 19, 2014
INVENTOR(S) : Bergqvist et al.

It is certified that error appears in the above-identified patent and that said Letters Patent is hereby corrected as shown below:

IN THE SPECIFICATION

In Column 5, Line 51, delete "(COO);" and insert -- (CCO); --, therefor.

In Column 7, Line 18, delete "BSC10" and insert -- BSC 10 --, therefor.

In Column 7, Line 23, delete "BTS10" and insert -- BSC 10 --, therefor.

IN THE CLAIMS

In Column 8, Line 59, in Claim 2, delete "A" and insert -- The --, therefor.

In Column 9, Line 1, in Claim 3, delete "A" and insert -- The --, therefor.

In Column 9, Line 12, in Claim 4, delete "A" and insert -- The --, therefor.

In Column 9, Line 17, in Claim 5, delete "A" and insert -- The --, therefor.

In Column 9, Line 23, in Claim 6, delete "A" and insert -- The --, therefor.

In Column 9, Line 32, in Claim 7, delete "A" and insert -- The --, therefor.

In Column 9, Line 43, in Claim 8, delete "A" and insert -- The --, therefor.

In Column 9, Line 52, in Claim 9, delete "A" and insert -- The --, therefor.

In Column 9, Line 55, in Claim 10, delete "A" and insert -- The --, therefor.

In Column 9, Line 58, in Claim 11, delete "A" and insert -- The --, therefor.

Signed and Sealed this
First Day of December, 2015

Michelle K. Lee
*Director of the United States Patent and Trademark Office*

CERTIFICATE OF CORRECTION (continued)
U.S. Pat. No. 8,811,166 B2

IN THE CLAIMS

In Column 10, Line 28, in Claim 14, delete "A" and insert -- The --, therefor.

In Column 10, Line 36, in Claim 15, delete "A" and insert -- The --, therefor.

In Column 10, Line 38, in Claim 15, delete "is in a" and insert -- is in --, therefor.

In Column 10, Line 46, in Claim 16, delete "A" and insert -- The --, therefor.

In Column 10, Line 49, in Claim 17, delete "A" and insert -- The --, therefor.

In Column 10, Line 52, in Claim 18, delete "A" and insert -- The --, therefor.

In Column 10, Line 55, in Claim 19, delete "A" and insert -- The --, therefor.